United States Patent
Bardinet et al.

(10) Patent No.: US 11,705,612 B2
(45) Date of Patent: Jul. 18, 2023

(54) FLEXIBLE WAVEGUIDE

(71) Applicant: Airbus Defence and Space Limited, Stevenage (GB)

(72) Inventors: Arthur Bardinet, Stevenage (GB); Richard Roberts, Stevenage (GB); Stephen Mclaren, Stevenage (GB)

(73) Assignee: Airbus Defence and Space Limited, Stevenage (GB)

( * ) Notice: Subject to any disclaimer, the term of this patent is extended or adjusted under 35 U.S.C. 154(b) by 272 days.

(21) Appl. No.: 17/254,823

(22) PCT Filed: May 2, 2019

(86) PCT No.: PCT/GB2019/051227
§ 371 (c)(1),
(2) Date: Dec. 21, 2020

(87) PCT Pub. No.: WO2019/243766
PCT Pub. Date: Dec. 26, 2019

(65) Prior Publication Data
US 2021/0265714 A1    Aug. 26, 2021

(30) Foreign Application Priority Data
Jun. 21, 2018   (GB) .................................... 1810223

(51) Int. Cl.
*H01P 3/127*    (2006.01)
*H01P 3/00*    (2006.01)
*H01P 1/207*    (2006.01)
*B64G 1/66*    (2006.01)

(52) U.S. Cl.
CPC ................ *H01P 3/127* (2013.01); *B64G 1/66* (2013.01); *H01P 1/207* (2013.01); *H01P 3/00* (2013.01)

(58) Field of Classification Search
CPC . H01P 3/127; H01P 3/00; H01P 1/207; B64G 1/66
USPC ....................................................... 333/208
See application file for complete search history.

(56) References Cited

U.S. PATENT DOCUMENTS

| | | |
|---|---|---|
| 3,444,487 A | 5/1969 | Krank et al. |
| 4,047,133 A | 9/1977 | Merle |

FOREIGN PATENT DOCUMENTS

| | | |
|---|---|---|
| CA | 1 264 241 A | 1/1990 |
| JP | S57 81702 A | 5/1982 |

*Primary Examiner* — Rakesh B Patel
(74) *Attorney, Agent, or Firm* — Blank Rome LLP (57) ABSTRACT

An elongate flexible waveguide section for radio frequency signals is provided, wherein the waveguide section is corrugated in the longitudinal direction, and the waveguide section is at least partially corrugated in a circumferential direction perpendicular to the longitudinal direction. Also provided is an apparatus for connecting a VHTS antenna system to a spacecraft.

16 Claims, 5 Drawing Sheets

FLEXIBLE WAVEGUIDE

CROSS-REFERENCE TO RELATED APPLICATIONS

This application is a national phase application of PCT/GB2019/051227, filed May 2, 2019, which claims priority to Great Britain Application No. 1810223.6, filed Jun. 21, 2018. The entire contents of those applications are incorporated herein by reference.

TECHNICAL FIELD

The present invention relates to flexible waveguides for radio frequency signals, and particularly, but not exclusively, to guiding radio frequency signals in a satellite system using flexible waveguides.

BACKGROUND ART

Waveguides are commonly used in a wide range of applications, for guiding an electromagnetic wave along a desired path. For example, in a communications satellite, it may be necessary to pass a received microwave signal through a number of components (e.g. amplifiers, filters, multiplexers) before retransmitting the signal. In this case, a waveguide may be used to carry the signal from one component to the next.

In conventional spacecraft systems, for example, containing a large number of components and requiring a large number of interconnecting waveguides, the design of the system can become particularly complex in order to ensure that all of the required signal paths for the system can be accommodated physically. The evolution in complexity of multi-beam antennas has resulted in problems when trying to connect the antenna assembly to the spacecraft payload and platform. For example, each feed chain in a SFPB (single feed per beam) antenna can have up to four associated waveguides for orthogonal polarized transmit and receive beams, which need to be connected back to the payload waveguides. This can lead to many hundreds of waveguide connections for the most complex systems.

Using rigid waveguides, or even conventional semi-flexible waveguides, it can be very difficult to engineer interfaces based on such connections. Long waveguides may be required to enable routing under, over and around the components or other waveguides, and waveguides may need to be spaced out and arranged over many spatial layers to achieve a particular network. It can be difficult to include the required support structure for such complex configurations, and the longer the unsupported lengths of waveguide, the higher the likelihood of the waveguide being affected by vibrations, for example those occurring during launch of a satellite payload containing the waveguide network.

In satellite applications, since the antenna typically runs much hotter than the spacecraft platform or payload there is a lot of differential thermal expansion across the interface between the antenna and the payload or platform, which results in enforced displacement on the waveguides which run across this connection. The length of waveguide required to provide sufficient flexibility to absorb the thermo-elastic displacements is difficult to fit into the available volume, and requires many unique configurations for different applications. These unique designs cost a lot of money to individually design, analyse and manufacture.

Figure 1:
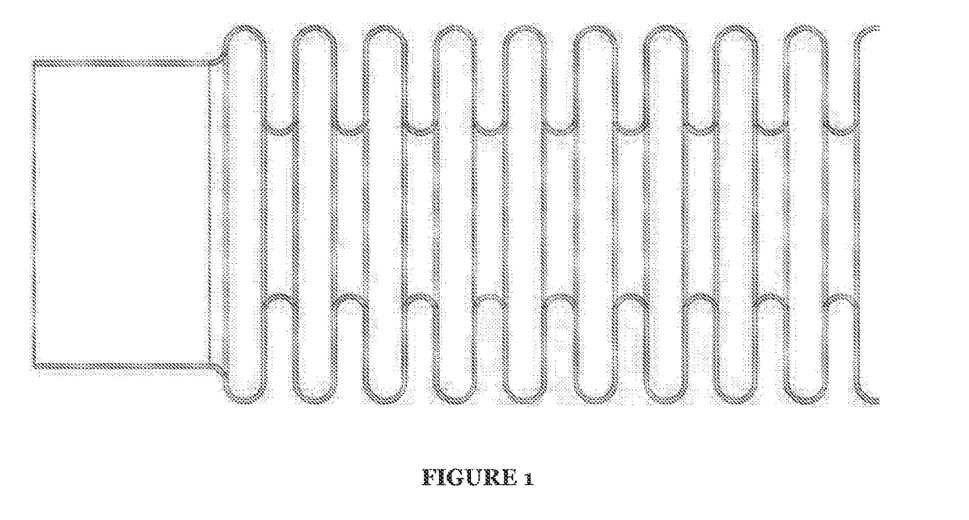
FIG. 1 illustrates an example of a corrugated waveguide according to the prior art.

FIG. 1 illustrates a cross-section of an example of a waveguide according to the prior art which is adapted to improve flexibility. The waveguide contains corrugations in its wall, which accommodate bending of the waveguide by facilitating stretching of the waveguide wall at the outside of a bend, and compression of the waveguide wall at the inside of a bend. Such designs are generally suitable for bending through large angles, whilst maintaining a cross-section shape, and the bending capability is based on the material of the waveguide. Typically, bending cannot be repeated over large numbers of cycles without causing mechanical fatigue and damage to the waveguide. The elastic stiffness of this design is very high, and so forces transmitted across a signal interface are also very high.

In other conventional systems, a semi-rigid waveguide might be fabricated by convoluting and forming a continuous solid walled tube. It can be used within its elastic limits and is able to bend and stretch but it is relatively stiff and the size of the elastic deflections achievable per unit length of waveguide are small. It can also be used beyond its elastic limits but in this case, its fatigue endurance is quite limited.

Embodiments of the present invention aim to improve the flexibility of waveguides, and to do so in a manner which maximises endurance.

SUMMARY OF INVENTION

According to an aspect of the present invention, there is provided an elongate flexible waveguide section for radio frequency signals, wherein the waveguide section is corrugated in the longitudinal direction and the waveguide section is at least partially corrugated in a circumferential direction perpendicular to the longitudinal direction.

The longitudinal profile of the waveguide section may comprise at least one of a repeated sinusoidal pattern, a smoothed triangular pattern and a smoothed square pattern.

The corrugated circumferential profile of the waveguide section may comprise at least one of a repeated sinusoidal pattern, a repeated smoothed triangular pattern and a repeated smoothed square pattern.

According to another aspect of the present invention, there is provided a waveguide comprising one or more of the above elongate flexible waveguide sections.

The waveguide may further comprise one or more non-corrugated waveguide sections.

According to another aspect of the present invention, there is provided an apparatus for a Very High Throughput Satellite, VHTS, system comprising a plurality of the above waveguides arranged to connect a respective antenna to a spacecraft platform, and a manifold arranged to connect to each of the plurality of elongate flexible waveguides, the manifold arranged to profile an interface between the waveguides and the spacecraft platform.

The innovative geometry of the design of the embodiments of the present invention maximises flexibility, to enable the required function of the waveguides to be achieved in as compact a volume as possible. This compactness enables a large number of connections in, for example, complex multi-beam antennas on Very High Throughput Satellite (VHTS) missions.

BRIEF DESCRIPTION OF DRAWINGS

Embodiments of the present invention will be described by way of example only, with reference to the accompanying drawings, in which.

DETAILED DESCRIPTION OF EMBODIMENTS

Figure 2:
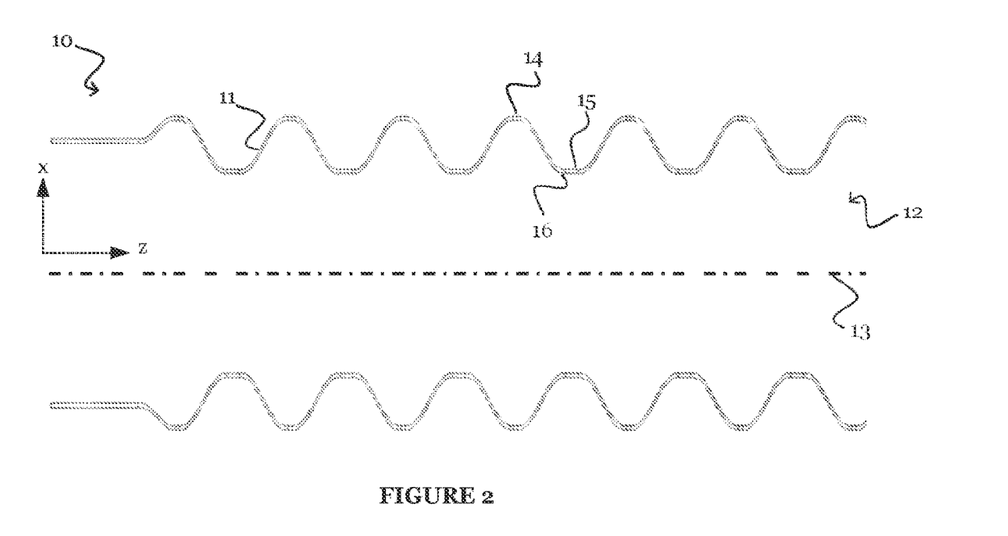
FIG. 2 illustrates a longitudinal section of a waveguide according to an embodiment of the present invention.

FIG. 2 illustrates a longitudinal section of a waveguide 10 according to an embodiment of the present invention. The waveguide 10 is designed to be used in spacecraft systems, for example, to guide RF signals between an antenna and a spacecraft platform or payload.

The waveguide 10 comprises an elongate wall 11 which bounds a hollow interior channel 12 through which RF signals pass between points in a signal network to which the waveguide 10 is connected. Examples of the connection of the waveguide 10 to the signal network is described in further detail below.

Both interior and exterior surfaces of the wall 11 of the waveguide 10 are corrugated in the longitudinal direction. The corrugations, referred to herein as 'longitudinal corrugations' or 'axial corrugations' have a generally sinusoidal profile having undulations in the wall surface. The amplitude of the corrugations extends in the radial direction of the waveguide 10, perpendicular to the longitudinal axis 13 of the waveguide 10. Corrugation peaks 14 are those parts of the waveguide wall 11 furthest from the central longitudinal axis 13 of the waveguide, and corrugation troughs 16 or valleys are those parts of the waveguide wall 11 closest to the central longitudinal axis 13 of the waveguide.

In the present embodiment, flat portions 15 are arranged at the troughs 16 of the corrugations, with smoothed transitions between the corrugation and the flat portion 15, which is found to optimise both RF and mechanical properties, including a reduction in stress concentration and RF loss peaks. In alternative embodiments, the flat portions 15 may be arranged at the peaks 14 to provide mechanical assistance, or at both the peaks 14 and the troughs 16.

Figure 3:
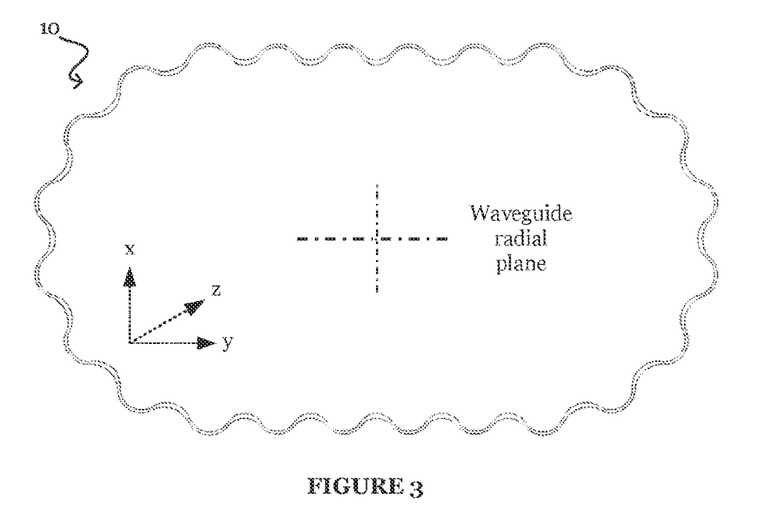
FIG. 3 illustrates a radial cross-section of the waveguide illustrated in FIG. 2.

FIG. 3 illustrates a radial cross-section of the waveguide 10 illustrated in FIG. 2. In the present disclosure, the plane of the radial cross-section will be referred to as the x-y plane, and the longitudinal extent of the waveguide will be referred to as the z-direction.

The waveguide 10 of the present embodiment has a generally elliptical cross-section with a corrugated circumference. The corrugations of the circumference are referred to herein as 'circumferential undulations' or 'circumferential corrugations' extending around the circumference, and having an amplitude that extends in the radial direction of the waveguide 10, perpendicular to the longitudinal axis 13 of the waveguide. The circumferential undulations have a generally sinusoidal profile.

Figure 4:
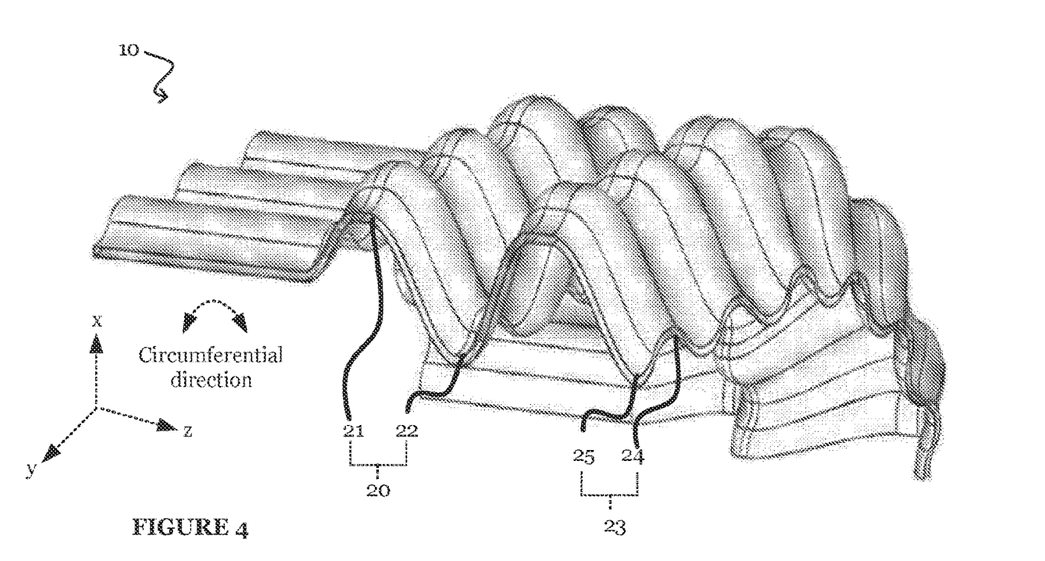
FIG. 4 illustrates a perspective view of the waveguide of FIGS. 2 and 3.

FIG. 4 illustrates a perspective view of the waveguide 10 of FIGS. 2 and 3. Illustrated are longitudinal corrugations 20 having peaks 21 and troughs 22. Also illustrated are circumferential undulations 23 having peaks 24 and troughs 25 extending around circumferences of radial cross-section of the waveguide 10. In other words, circumferential undulations are present a) at the peaks of the longitudinal corrugations, b) at the troughs of the longitudinal corrugations as illustrated by the example peaks 24 and troughs 25 shown in FIG. 4 and c) in between the peaks and the troughs of the longitudinal corrugations 20.

Figure 5:
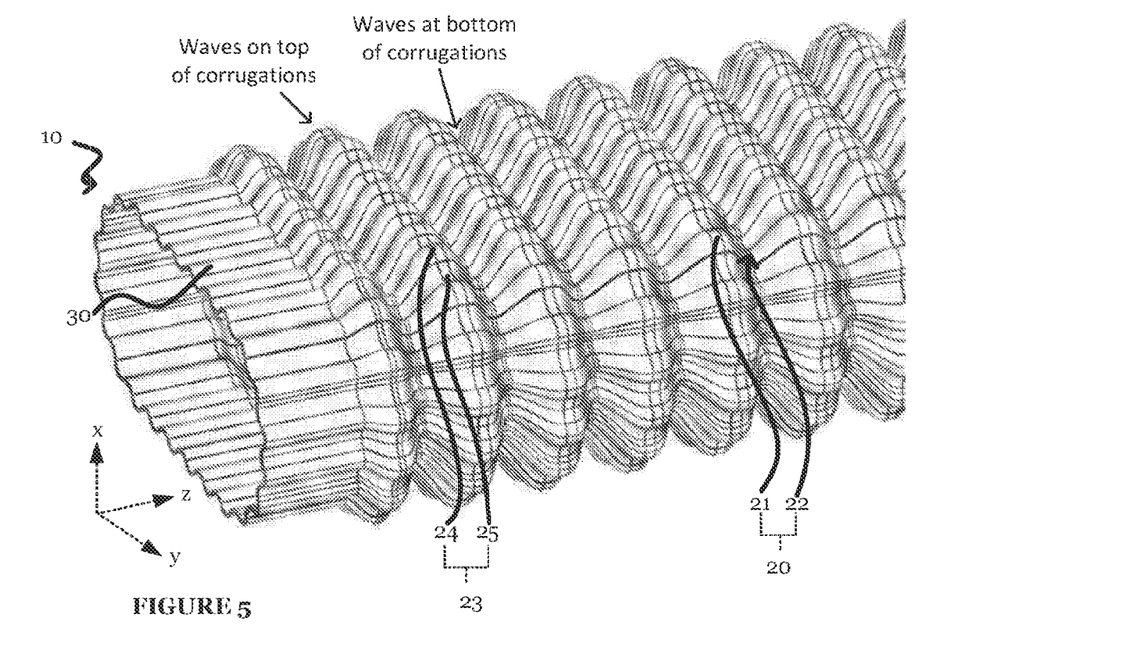
FIG. 5 illustrates a further perspective view of the waveguide of FIGS. 2 and 3.

FIG. 5 illustrates a further perspective view of the waveguide 10 of FIGS. 2 and 3, in which circumferential undulations 23 are present around radial sections along the entire length of the waveguide 10. The amplitude of the circumferential undulations 23 is modulated by the amplitude of the longitudinal corrugations 20, throughout the waveguide wall profile. Consequently, the waveguide 10 can be seen to exhibit corrugations in two perpendicular directions, and shall be referred to herein as an 'ortho-corrugated' waveguide.

In the illustration of FIG. 5, a longitudinally flattened portion 30 of the waveguide 10 is shown which is configured for interfacing with other waveguides or network components, to be described in more detail below.

The configuration illustrated in FIG. 5 has improved flexibility per unit length of waveguide, when compared with conventional waveguides which have no corrugations, or only longitudinal corrugations. Additionally, the configuration illustrated in FIG. 5 has improved flexibility, compared with conventional flexible waveguides, for a given wall thickness and/or cross-section and/or material. As a consequence of the improved flexibility, the necessary displacement function provided by the waveguide of FIG. 5 can be achieved with a shorter waveguide length, having a more compact volume, than conventional configurations, which reduces mass and improves resistance to mechanical loading environments.

The improved flexibility arises because the waveguide 10 is able to accommodate variations in cross section by relative expansion or compression of the circumference of the cross section of the waveguide wall 11. On expansion, the peaks 21 and troughs 22 of the longitudinal corrugations 20 separate in the longitudinal direction. The circumferential undulation peaks 24 move closer to each other and inwards towards the central longitudinal axis 13. The circumferential troughs 25 move away from each other as they move outward from the central longitudinal axis 13. On compression, the peaks 21 and troughs 22 of the longitudinal corrugations 20 compress in the longitudinal direction. The circumferential undulation peaks 24 move away from the central longitudinal axis 13 and the circumferential undulation troughs 25 move inwardly towards the central longitudinal axis 13. Stress on the waveguide wall material itself can be significantly reduced through this configuration.

The reduction in stress imposed on the waveguide wall material during bending and/or stretching, due to the circumferential undulations 20, enables the lifetime of the waveguide 10 to be significantly lengthened compared with a rigid or longitudinally corrugated waveguide. In other words, waveguides of embodiments of the invention can accommodate a significantly larger number of repetitive bending and/or stretching movements without reaching mechanical fatigue limits because the waveguide material itself is not excessively stretched or compressed at any stage during its lifetime.

Flexibility in the cross-sectional area, which may be provided by embodiments of the present invention, may provide an additional degree of freedom of movement to the waveguide 10, enabling a reduction in the space taken up the waveguide section.

It will be appreciated that a number of modifications can be made to the embodiment described with reference to FIGS. 2-5 without departing from the scope of the invention.

The corrugations illustrated in both FIGS. 2 and 3 are described as generally sinusoidal. In alternative embodiments, the longitudinal corrugations 20 and/or circumferential undulations 23 have a smoothed triangular profile or a smoothed square profile, and further embodiments can have a combination of swept sinusoidal and other convolutions.

The specific choice of corrugation/undulation profile, including the shape, the pitch and amplitude of the corrugations/undulations, is based on the particular application and intended environment for the waveguide, taking into account the required mechanical flexibility and design constraints imposed by requirements on RF signal performance. For example, certain configurations may be restricted by available space and numbers of waveguides in a particular signal network, whilst other configurations may have a very low tolerance in relation to signal reflection/loss but more relaxed spatial constraints. Given that both mechanical and electrical performance can be simulated for a given waveguide design, it is possible to test waveguide designs under a variety of conditions in order to optimise the design, and to determining appropriate configurations using empirical means.

Figure 6:
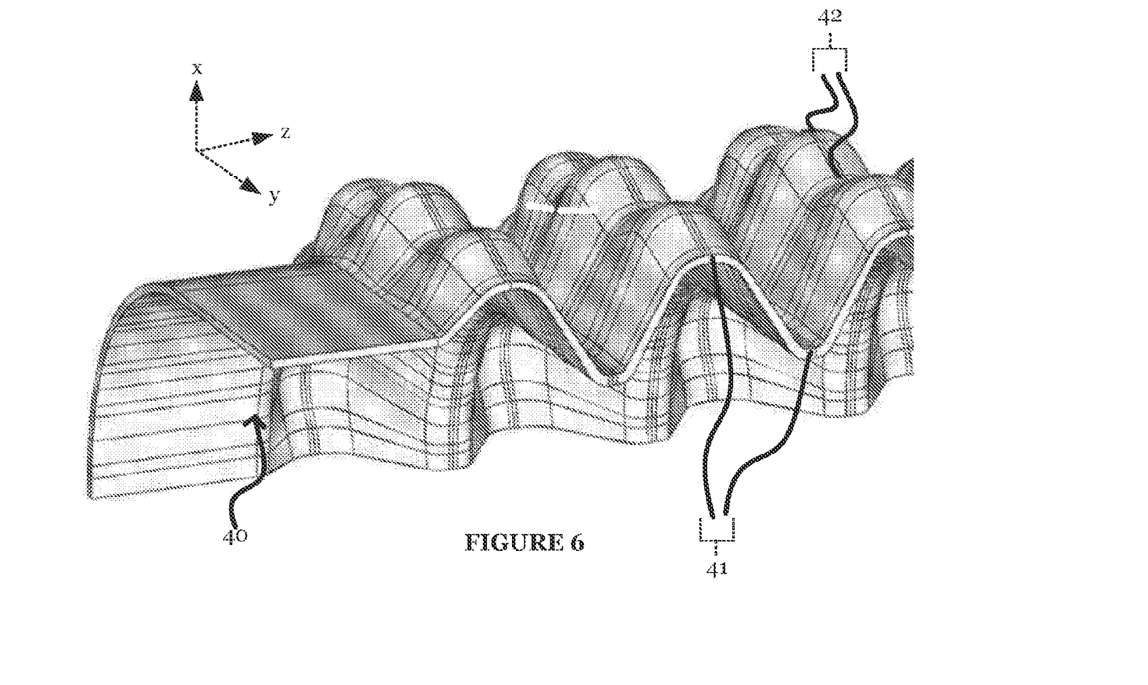
FIGS. 6 and 7 illustrate sectional views of waveguide sections according to further embodiments of the present invention.
Figure 7:
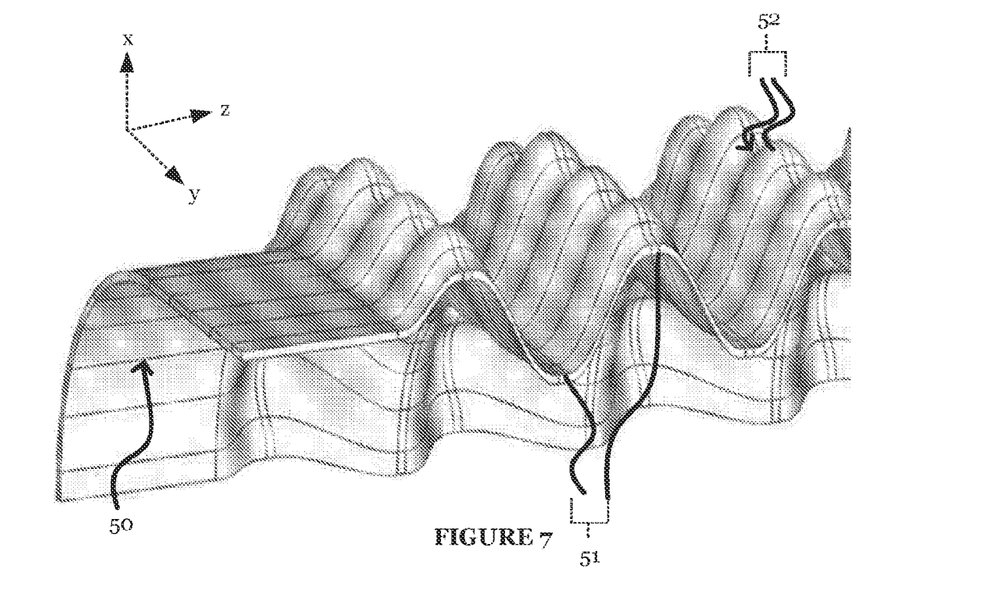

FIGS. 6 and 7 illustrate sectional views of waveguide sections 40, 50 according to further embodiments of the present invention. The sectional view illustrates the profile of the longitudinal corrugations 41, 51. In comparison to the embodiment shown in FIG. 6, the pitch of the circumferential undulations 52 is shorter in the embodiment of FIG. 7 than that of the circumferential undulations 42 in FIG. 6, resulting in narrower or sharper undulations or corrugations.

Further design flexibility is achieved in some embodiments through making use of variations to corrugation profiles both along the length of the waveguide, and around the circumference, provided that where the waveguide is at least partially corrugated in the radial direction to have circumferential undulations, longitudinal corrugations are also present. The variations may take the form of different corrugation shapes, amplitudes and pitches, and it in some cases, the corrugations may be absent altogether from a portion of the waveguide. Such portions of the waveguide may be considered as rigid portions, and these portions may be suitable for regions of a signal network in which electrical performance is to be optimised, and/or no minimal spatial constraints are present.

Figure 8:
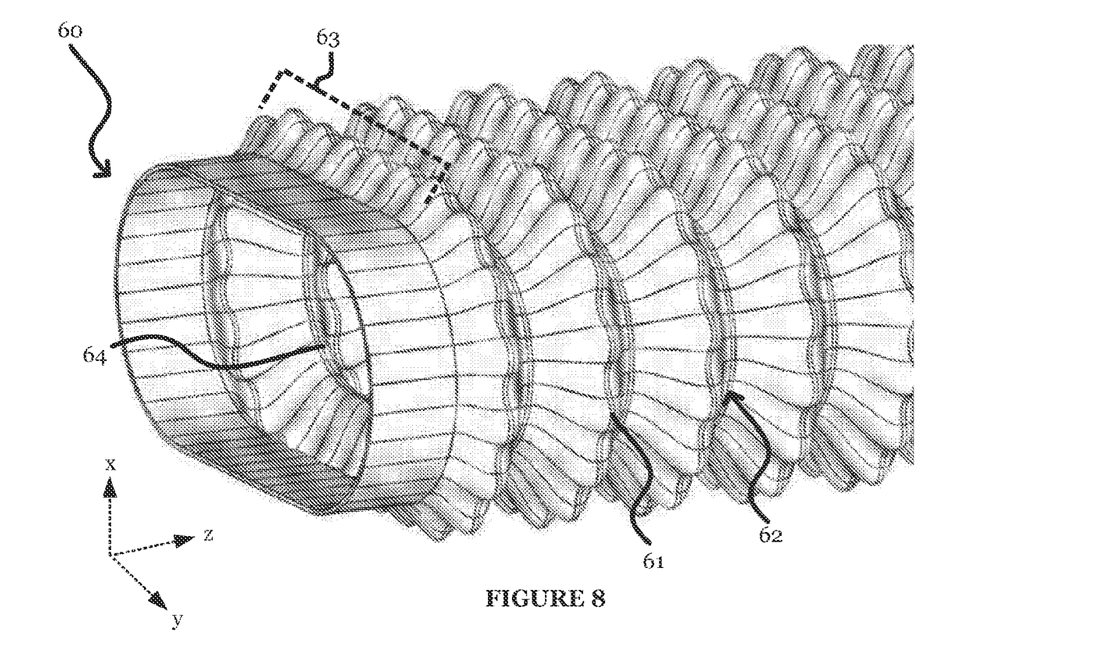
FIG. 8 illustrates a perspective view of a waveguide according to a further embodiment of the present invention.

FIG. 8 illustrates a perspective view of an example of one such variation in a waveguide 60 according to an embodiment of the present invention. In the present embodiment, the circumferential undulations 63 are present on the peaks 61 of the longitudinal corrugations of the illustrated waveguide 6o, but not on the troughs 62 of the longitudinal corrugations. The interior of the waveguide wall is shown as having circumferential ribs 64, representing the troughs of the longitudinal waveguides, and the ribs 64 are substantially smooth. This design is found to optimise manufacturability.

It will be appreciated that the ortho-corrugated design of the present invention can be considered to be present in longitudinal sections of a waveguide, rather than being required along the entire length of the waveguide. A waveguide can thus include both ortho-corrugated sections and rigid sections, where required for a particular application.

The waveguide and waveguide sections of embodiments of the present invention can be obtained via various manufacturing techniques. According to an embodiment of the present invention, blow-moulding is used. Blow-moulding comprises building a mould defining a mould cavity of the required orthogonal corrugation configuration and a blowing means for introducing a blowing agent under pressure into the interior of the mould. By blowing a gas source into the interior of the mould with a suitable material (which can be aluminium in an embodiment), the waveguide or waveguide section is manufactured with a hollow interior and an at least partially orthogonally corrugated wall to guide an RF signal through the hollow interior in a propagation direction.

Other manufacturing techniques such as superplastic forming, electro-erosion, electro-forming, additive manufacturing can also be used in other embodiments of the current invention.

The thickness of the wall can be 0.1 mm according to an embodiment of the current invention, but alternative embodiments can have a different thicknesses or thicknesses varying along the length or around the circumference, defined by design or subject to the manufacturing process used. For example, the wall thickness may increase closer to the central longitudinal axis.

The manufacturing processes enable a waveguide or waveguide section to be produced having a continuous solid wall, achieving good electromagnetic compatibility (EMC), minimising leakage, and optimising passive intermodulation (PIM) performance.

Table 1 illustrates a comparison of mechanical properties of an ortho-corrugated waveguide according to an embodiment of the present invention, in comparison with a corrugated flexible waveguide of the type illustrated in FIG. 1.

TABLE 1

Comparison of mechanical waveguide performance

|  | Corrugated waveguide (FIG. 1) | Ortho-corrugated waveguide (FIGS. 6 and 7) | Reduction factor |
|---|---|---|---|
| Maximum traction stress | 230 MPa | 120-170 MPa | 1.4-1.9 |
| Maximum bending stress | 113 MPa | 50-70 MPa | 1.6-2.3 |
| Resistance to traction | 26.9 N | 4.5-13.6 N | 2.0-6.0 |
| Resistance to bending | 0.6 N | 0.11-0.37 N | 1.6-5.4 |

To provide the data in Table 1, a corrugated flexible waveguide design of FIG. 1 and the waveguide design according to embodiments of the present invention as illustrated in FIGS. 6 and 7, having the same length as the corrugated waveguide of FIG. 1, and the same profile of longitudinal corrugations, were subjected to simulated traction and bending forces. The traction force was selected to be that which enforced elongation of the waveguide by 1 mm in length. The bending force was selected to be that which enforced a displacement of the waveguide by 2 mm.

The embodiments of the present invention demonstrated significantly enhanced flexibility compared with the known waveguide, as illustrated through a) the reduction in relative traction stress, b) the reduction in relative bending stress, c) the reduction in relative traction resistance, and d) the reduction in bending resistance.

RF analysis of the waveguide section of FIG. 1, and the embodiment of the present invention, confirmed that there was no compromise in RF signal quality caused by the enhanced flexibility.

Embodiments of the present invention provide flexible waveguides which can be used on Earth or in space, and the waveguides can be scaled to any size. Although elliptical cross-sections are described above, a number of alternative waveguide cross-sections are possible, such as obround, rectangular, or oval, and it will be appreciated that references herein to the term "wall" apply to multiple walls in the case of rectangular waveguides.

The flexibility of the design makes it recommended in applications where a relative movement between start and end of the waveguide is expected in service, including if this movement is repeated for a large number of cycles (for example at the interface between an antenna and the spacecraft platform, on a telecommunications satellite). In some embodiments, as many as 20,000 cycles over a 15-20 year lifetime might be required to be sustained. The design can also be used to connect two waveguide ports for which the relative positions are not expected to be accurate, and which may be associated with errors. A flexible waveguide can bend and stretch to take up geometrical errors and connect the ports.

It can also be used to reduce the forces transmitted across a waveguide interface. Its flexibility will ensure only a very small force is transmitted to a port when the opposite port moves relatively. When connected to the interface, the thermo-elastic displacement load presented by the waveguides on the interface, is also reduced because the displacements can be accommodated by the flexibility of the waveguide. For a rigid waveguide, for example, thermo-elastic displacement load is increased compared with a flexible waveguide, because thermal expansion or contraction of the waveguide will be transmitted to the interface, since there is lower capacity to accommodate flexibility in the waveguide wall through corrugations.

The reduction in thermo-elastic displacement load enables waveguide interface design to be improved in embodiments of the present invention. The improvement results from the relaxed coupling constraints imposed on the interface since a lower thermo-elastic displacement is to be expected. In embodiments of the present invention, this enables a simplification of the interface through, for example, accommodating multiple waveguide ports in the same flange, each waveguide sharing the coupling effect of a fixing mechanism such as bolts in the interface. Conventionally, such sharing may not be possible such that each waveguide requires its own flange and its own fixing mechanism to ensure that the thermo-elastic displacement load can be accommodated. Consequently, the waveguide ports can be compressed into a more compact area, simplifying the manufacture and/or assembly operation, and also the cost and mass of the resultant structure.

In the case of VHTS systems requiring dense clusters of narrow antenna feeds, in which waveguides are typically configured in bundles using additive manufacturing techniques, groups of large numbers of waveguides can be terminated at a single manifold according to embodiments of the present invention. This reduces the differential errors in the coupling of individual waveguides which might otherwise arise where each waveguide requires its own individual coupling to be secured. The manifolds can be manufactured using additive manufacturing, such that the manifolds are integral with the waveguide bundles.

VHTS systems using conventional waveguides require complex design solutions to accommodate the increased thermo-elastic displacement loads. Consequently, the improved compactness provided by embodiments of the present invention is a significant enabler of the large number of connections required between antennas and the spacecraft for complex multi-beam antennas on VHTS missions.

Figure 9:
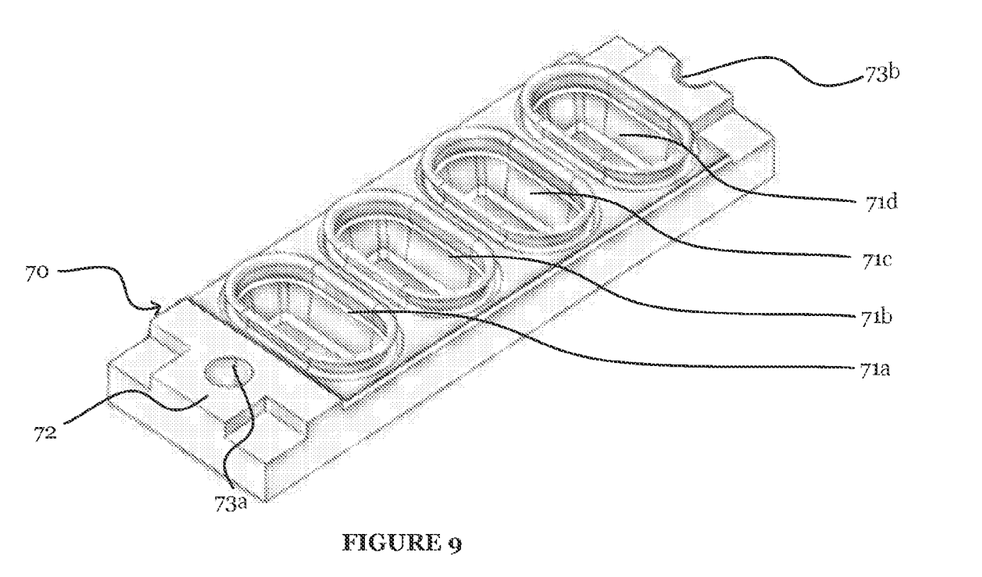
FIG. 9 illustrates an example of a manifold for a waveguide interface according to an embodiment of the present invention.

FIG. 9 illustrates an example of a manifold 70 for a waveguide interface according to an embodiment of the present invention. The interface comprises four waveguide ports 71a-d and two coupling portions 73a, 73b in the flange 72 of the manifold 70.

Figure 10:
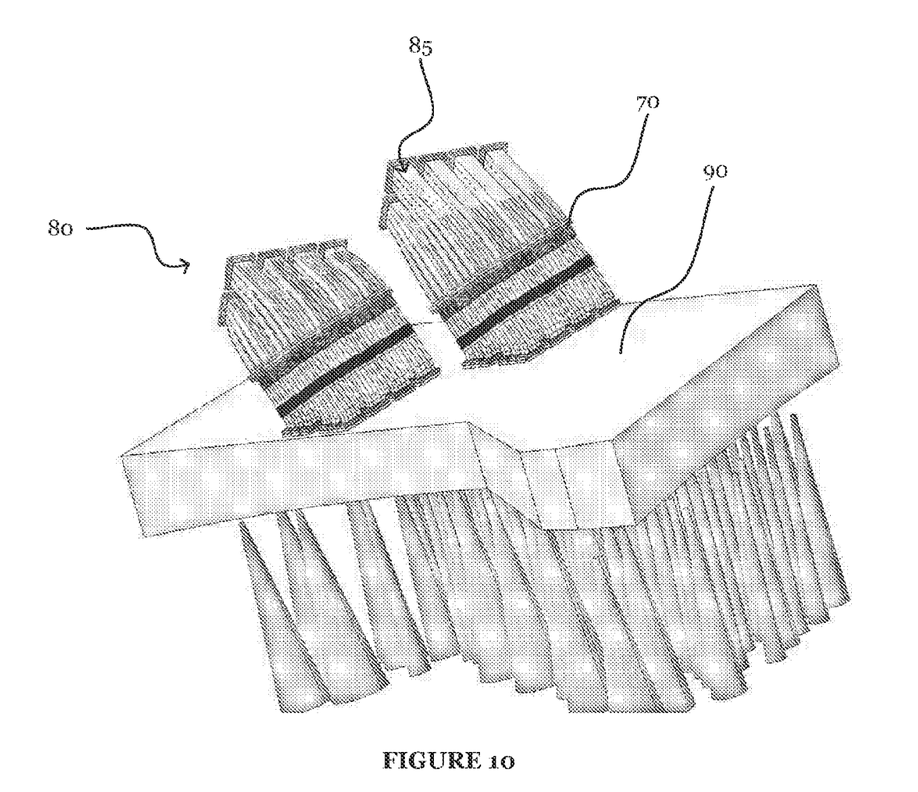
FIG. 10 illustrates an example of the use of flexible waveguides according to embodiments of the present invention, in a VHTS system.

FIG. 10 illustrates an example of the use of flexible waveguides according to embodiments of the present invention, in a VHTS system 80. Bundles of waveguides 85 are terminated in a manifold section 70 such as that shown in FIG. 9 for connection to the antenna feed section 90 of the network.

In summary, embodiments of the present invention provide a flexible waveguide or flexible waveguide section having greater flexibility within the elastic limit than conventional designs, per unit length of waveguide or other design parameters. Therefore, it allows the necessary displacement function to be achieved in a shorter length and more compact volume, with less mass and greater resistance to mechanical loading environments.

By staying further within the material elastic limits, the bending and stretching deflections can be repeated a large number of times, lengthening the fatigue life of the waveguide or waveguide section.

The exact shapes of the axial and radial corrugations can be tuned for different waveguide sizes to minimise return loss. In some embodiments, the amplitude may be of the order of 2 mm, while the pitch may be of the order of 2.5 mm, but the present invention is not limited to these specific dimensions.

Although embodiments of the present invention have been described with respect to satellite applications, the present invention is not so limited, and embodiments can be arranged in terrestrial RF signal systems without departing from the scope of the invention. It will be appreciated that combinations of compatible features of different embodiments described herein may also be made without departing from the scope of the invention.

The invention claimed is:

1. An elongate flexible waveguide section for radio frequency signals, wherein:
   the waveguide section has a first series of corrugations in a longitudinal direction; and
   the waveguide section has a second series of corrugations in at least a portion of a circumferential direction perpendicular to the longitudinal direction;
   wherein the amplitude of the second series of corrugations is modulated by an amplitude of the first series of corrugations.

2. An elongate flexible waveguide section according to claim 1, wherein the second series of corrugations comprises at least one of a repeated sinusoidal pattern, a repeated smoothed triangular pattern and a repeated smoothed square pattern.

3. An elongate flexible waveguide section according to claim 2, wherein the second series of corrugations of the waveguide section is applied fully on peaks of the first series of corrugations, whilst troughs of the first series of corrugations have no circumferential corrugations.

4. A waveguide comprising one or more elongate flexible waveguide sections according to claim 2.

5. A waveguide according to claim 4, further comprising one or more non-corrugated waveguide sections.

6. An apparatus for a Very High Throughput Satellite, VHTS, system comprising:

a plurality of waveguides according to claim 5 arranged to connect a respective antenna to a spacecraft platform; and a manifold arranged to connect to each of the plurality of waveguides, the manifold arranged to profile an interface between the plurality of waveguides and the spacecraft platform.

7. An apparatus for a Very High Throughput Satellite, VHTS, system comprising:

a plurality of waveguides according to claim 4 arranged to connect a respective antenna to a spacecraft platform; and a manifold arranged to connect to each of the plurality of waveguides, the manifold arranged to profile an interface between the plurality of waveguides and the spacecraft platform.

8. A waveguide comprising one or more elongate flexible waveguide sections according to claim 1.

9. An apparatus for a Very High Throughput Satellite, VHTS, system comprising:

a plurality of waveguides according to claim 8 arranged to connect a respective antenna to a spacecraft platform; and a manifold arranged to connect to each of the plurality of waveguides, the manifold arranged to profile an interface between the plurality of waveguides and the spacecraft platform.

10. The waveguide according to claim 8, further comprising one or more non-corrugated waveguide sections.

11. An apparatus for a Very High Throughput Satellite, VHTS, system comprising:

a plurality of waveguides according to claim 10 arranged to connect a respective antenna to a spacecraft platform; and a manifold arranged to connect to each of the plurality of waveguides, the manifold arranged to profile an interface between the plurality of waveguides and the spacecraft platform.

12. An elongate flexible waveguide section according to claim 1, wherein the second series of corrugations of the waveguide section is applied fully on peaks of the first series of corrugations, whilst troughs of the first series of corrugations have no circumferential corrugations.

13. A waveguide comprising one or more elongate flexible waveguide sections according to claim 12.

14. An apparatus for a Very High Throughput Satellite, VHTS, system comprising:

a plurality of waveguides according to claim 13 arranged to connect a respective antenna to a spacecraft platform; and a manifold arranged to connect to each of the plurality of waveguides, the manifold arranged to profile an interface between the plurality of waveguides and the spacecraft platform.

15. A waveguide according to claim 13, further comprising one or more non-corrugated waveguide sections.

16. An apparatus for a Very High Throughput Satellite, VHTS, system comprising:

a plurality of waveguides according to claim 15 arranged to connect a respective antenna to a spacecraft platform; and a manifold arranged to connect to each of the plurality of waveguides, the manifold arranged to profile an interface between the plurality of waveguides and the spacecraft platform.

* * * * *